United States Patent
Bosma

(10) Patent No.: US 10,123,506 B2
(45) Date of Patent: Nov. 13, 2018

(54) ARRANGEMENT FOR MILKING ANIMALS

(71) Applicant: DELAVAL HOLDING AB, Tumba (SE)

(72) Inventor: Epke Bosma, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 326 days.

(21) Appl. No.: 14/898,812

(22) PCT Filed: Jun. 19, 2014

(86) PCT No.: PCT/SE2014/050767
§ 371 (c)(1),
(2) Date: Dec. 16, 2015

(87) PCT Pub. No.: WO2014/209203
PCT Pub. Date: Dec. 31, 2014

(65) Prior Publication Data
US 2016/0135424 A1    May 19, 2016

(30) Foreign Application Priority Data

Jun. 26, 2013 (SE) ...................................... 1350776

(51) Int. Cl.
*A01K 1/12* (2006.01)
*A01J 5/04* (2006.01)
*A01J 7/02* (2006.01)

(52) U.S. Cl.
CPC .................. *A01K 1/12* (2013.01); *A01J 5/044* (2013.01); *A01J 7/022* (2013.01)

(58) Field of Classification Search
CPC .............. A01J 7/022; A01J 5/004; A01K 1/12
See application file for complete search history.

(56) References Cited

U.S. PATENT DOCUMENTS 2,800,134 A  7/1957 Merritt
3,099,277 A  7/1963 Maehans
(Continued)

FOREIGN PATENT DOCUMENTS

AT   386 922 B    4/1988
DE   94 04 625 U1  5/1994
(Continued)

OTHER PUBLICATIONS

Jahoda translation, retrieved from internet Jan. 2, 2018.*
(Continued)

*Primary Examiner* — Kristen C Hayes
(74) *Attorney, Agent, or Firm* — Young & Thompson

(57) ABSTRACT

A arrangement for milking animals includes a milking station, a transport conduit, a main milk tank storing milk from the milking station, a connection conduit extending from the transport conduit to the main milk tank, a cleaning liquid arrangement, and a valve arrangement. From the milking station a connection pipe leads to the transport conduit at a connection point. The cleaning liquid arrangement is connected to the transport conduit via the valve arrangement. The valve arrangement is positionable in at least a first position and a second position. In the first position the transport conduit forms a loop such that two flow paths from the connection point to the connection conduit are provided by the transport conduit, and in the second position the loop is interrupted such that one flow path only from the connection point to the connection conduit is provided by the transport conduit.

20 Claims, 3 Drawing Sheets

(56) References Cited

U.S. PATENT DOCUMENTS

| | | | |
|---|---|---|---|
| 3,116,743 A | 1/1964 | Sparr | |
| 5,896,828 A | 4/1999 | Kronschnabel et al. | |
| 7,198,003 B2 | 4/2007 | Bosma et al. | |

FOREIGN PATENT DOCUMENTS

| | | |
|---|---|---|
| DE | 198 47 294 A1 | 10/1999 |
| DE | 10 2006 050 946 B3 | 12/2007 |
| DE | 20 2009 004 670 U1 | 9/2009 |
| EP | 0 144 389 B1 | 6/1985 |
| RU | 2 166 246 C1 | 5/2001 |
| SU | 1355184 A1 | 11/1987 |
| SU | 1687145 A1 | 10/1991 |

OTHER PUBLICATIONS

International-Type Search Report, dated Jan. 14, 2014, from corresponding PCT application.
International Search Report, dated Sep. 29, 2014, from corresponding PCT application.
Supplementary International Search Report, dated Sep. 4, 2015, from corresponding PCT application.

* cited by examiner

ARRANGEMENT FOR MILKING ANIMALS

TECHNICAL FIELD

The present invention relates to an arrangement for milking animals and transporting of milk from milking stations in the arrangement to a milk tank.

BACKGROUND

In a large milking installation including a number of milking stations there is provided a system for transporting milk from all the milking stations to a main milk tank for storing and cooling of milk. In such a system milk conduits extending from the milking stations to the main milk tank may be long. Besides transporting milk through the long conduits, cleaning of the long conduits constitutes a challenge. Proper cleaning of milking installations is important.

It is known to use the vacuum of a milking plant for transporting milk to a milk-receiving unit, from which milk receiving unit the milk is pumped to a main milk tank.

U.S. Pat. No. 7,198,003 discloses an arrangement for milking of animals. The arrangement includes a number of milking stations connected to a transport conduit. The transport conduit leads to a milk-collecting container. In the transport conduit the milk is transported by means of gravity to the milk-collecting container. From the milk-collecting container the milk is pumped to a central milk storage tank. During washing of the arrangement the central milk-collecting container is connected to a vacuum source for being subjected to vacuum, whereby washing liquid will be sucked through the transport conduit. The washing liquid is pumped through other parts of the arrangement.

There is a need for an alternative arrangement for milking animals comprising a number of milking stations.

SUMMARY

It is an object of the present invention to provide an arrangement for milking animals comprising a number of milking stations connected to a common transport conduit, in which arrangement efficient milk transport towards a main milk tank and efficient cleaning of the transport conduit may be provided.

According to an aspect of the invention, the object is achieved by an arrangement for milking animals comprising at least one milking station, a transport conduit, a main milk tank for storing milk from the at least one milking station, a connection conduit extending from the transport conduit to the main milk tank, and a cleaning liquid arrangement. The at least one milking station comprises a milking station pump and a connection pipe, the connection pipe being connected to the transport conduit at a connection point. The arrangement for milking animals comprises a valve arrangement arranged at least partially in the transport conduit. The cleaning liquid arrangement is connected to the transport conduit via the valve arrangement. The valve arrangement is adapted to be positioned in at least a first position and a second position. In the first position the transport conduit forms a loop such that two flow paths from the connection point to the connection conduit are provided by the transport conduit, and in the second position the loop is interrupted such that one flow path only from the connection point to the connection conduit is provided by the transport conduit.

Since in the first position the transport conduit forms a loop such that two flow paths from the connection point to the connection conduit are provided by the transport conduit, milk from the milking stations may be efficiently transported through the transport conduit towards the main milk tank. Moreover, since in the second position the loop is interrupted such that one flow path only from the connection point to the connection conduit is provided by the transport conduit, an efficient cleaning of the transport conduit may be provided. As a result, the above mentioned object is achieved.

The milking station may be a milking station for automatically milking animals, i.e. a milking station wherein teat cups of a milking machine are automatically attached to the teats of a relevant animal. In the case of more than one milking station, each milking station may be provided in a separate animal housing area such as a barn or a pasture, in which a herd of animals is housed over longer periods of time. Alternatively, two or more milking stations may be provided in the same animal housing area. As a further alternative the milking stations may be provided in one or more dedicated milking areas, i.e. areas in which a herd of animals is only temporarily housed during milking or through which a herd of animals passes for the main purpose of being milked.

The cleaning liquid arrangement may provide a cleaning liquid, e.g. water containing a detergent for cleaning and/or plain water for rinsing. From the cleaning liquid arrangement a cleaning liquid may pass only once though the transport conduit and the connection conduit. Alternatively, the cleaning liquid may circulate through the cleaning liquid arrangement, the transport conduit and at least part of the connection conduit. The valve arrangement may comprise a three-way valve or two two-way valves.

According to embodiments, in the first position of the valve arrangement a connection between the cleaning liquid arrangement and the transport conduit may be closed and in the second position of the valve arrangement the connection between the cleaning liquid arrangement and the transport conduit may be open. In this manner a connection to the cleaning liquid arrangement may be provided only during cleaning of the arrangement for milking animals.

According to embodiments, the cleaning liquid arrangement may comprise a cleaning liquid pump and a cleaning liquid container. The cleaning liquid pump may be adapted to pump cleaning liquid from the cleaning liquid container through the transport conduit, through at least part of the connection conduit, and back to the cleaning liquid container. In this manner a cleaning liquid may be circulated through the arrangement for milking animals.

According to embodiments, the arrangement may comprise a milk tank valve arranged in the connection conduit in vicinity of the main milk tank. The cleaning liquid arrangement may comprise a return conduit connected to the connection conduit at, or upstream of, the milk tank valve. In this manner a main portion of the connection conduit may be cleaned by the cleaning liquid arrangement. Any conduit portion downstream of the milk tank valve may be cleaned by a tank cleaning arrangement. Suitably, the return conduit may extend to the cleaning liquid container.

According to embodiments, the milking station pump of the milking station may be adapted to pump milk from the milking station to the main milk tank via the transport conduit and the connection conduit. In this manner further milk transport pumps in the transport conduit or in the connection conduit may be omitted.

According to embodiments, the arrangement may comprise at least one further transport conduit and at least one further milking station connected to the further transport conduit. The cleaning liquid arrangement may be connected to the further transport conduit via the valve arrangement and the connection conduit may extend from the further transport conduit to the main milk tank. The at least one further milking station may comprise a connection pipe connected to the further transport conduit at a connection point. In the first position of the valve arrangement the further transport conduit may form a further loop such that two flow paths from the connection point to the connection conduit may be provided by the further transport conduit. In the second position of the valve arrangement the further loop may be interrupted such that one flow path only from the connection point to the connection conduit may be provided by the further transport conduit. In this manner the milking stations of the arrangement may be connected to the main milk tank via two transport conduits and one common connection conduit. For instance, one transport conduit may connect milking stations of one section of the arrangement to the connection conduit and the other transport conduit may connect milking stations of a different section of the arrangement to the connection conduit. The sections of the milking arrangement may for example be constituted by different sections of a barn, different barns, or different pastures.

Further features of, and advantages of, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
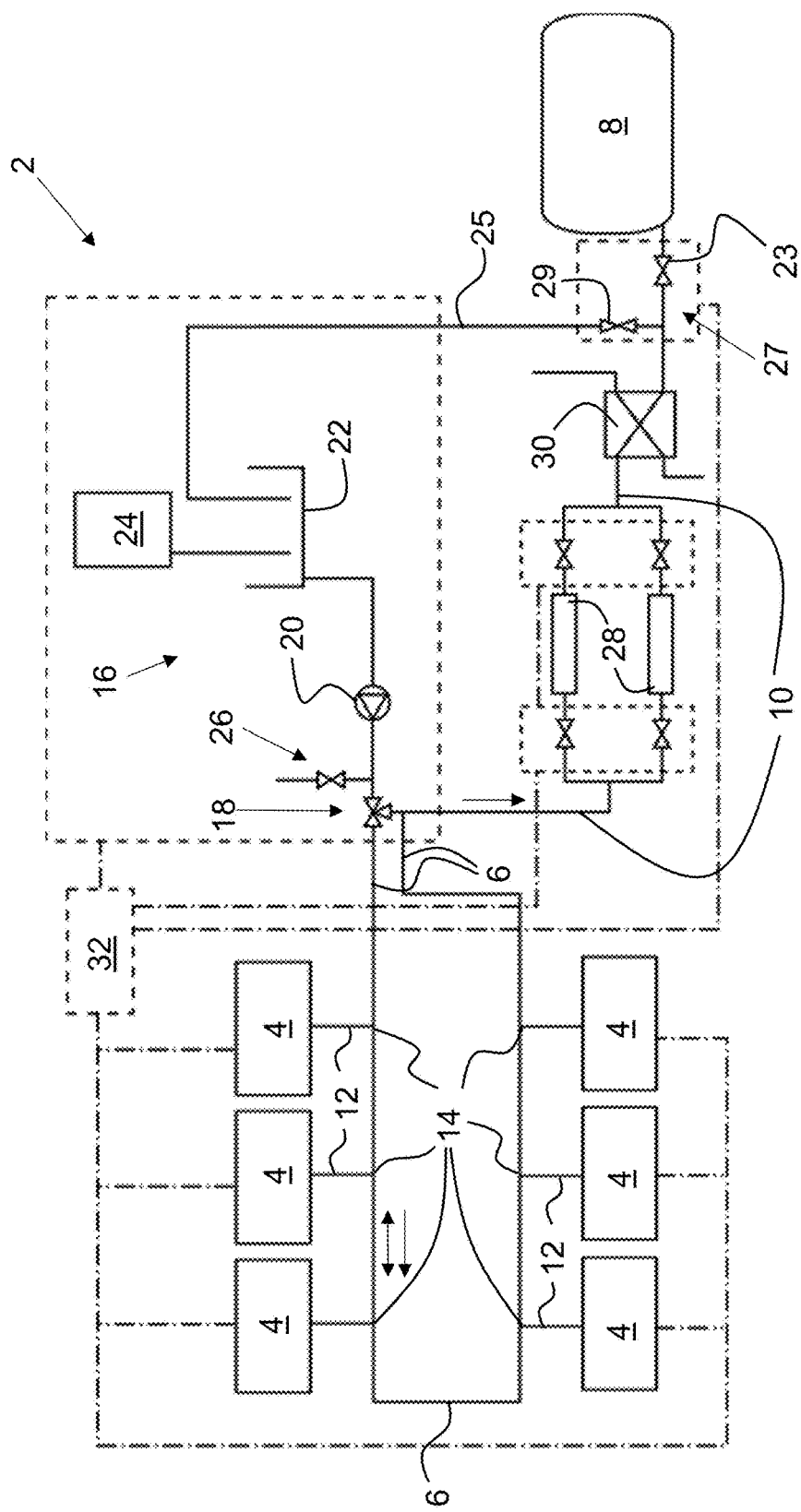
FIG. 1 illustrates embodiments of an arrangement for milking animals comprising at least one milking station.

FIG. 1 illustrates embodiments of an arrangement 2 for milking animals comprising at least one milking station 4. In these embodiments six milking stations 4 are illustrated. Other numbers of milking stations may alternatively be provided. The arrangement 2 further comprises a transport conduit 6, a main milk tank 8 for storing milk from the milking stations 4, and a connection conduit 10 extending from the transport conduit 6 to the main milk tank 8. Each milking station 4 comprises a milking station pump and a connection pipe 12, see further below with reference to FIG. 3. Each connection pipe 12 is connected to the transport conduit 6 at a connection point 14.

The arrangement 2 for milking animals further comprises a cleaning liquid arrangement 16, and a valve arrangement 18 arranged at least partially in the transport conduit 6. The cleaning liquid arrangement 16 is adapted for cleaning parts of the arrangement 2 for milking animals, mainly the transport conduit 6 and the connection conduit 10. The cleaning liquid arrangement 16 is connected to the transport conduit 6 via the valve arrangement 18. The valve arrangement 18 comprises a three-way valve. Alternatively, the valve arrangement 18 may comprise a different valve arrangement, such as e.g. two two-way valves. The valve arrangement 18 may comprise a valve of the boot-seal type. Such valves are known in the art and provide a hygienic valve suitable for directing a flow of milk. Other types of hygienic valves may alternatively be used.

The valve arrangement 18 is adapted to be positioned in at least a first position and a second position. In the first position the transport conduit 6 forms a loop such that two flow paths (as illustrated by the double headed arrow) from each connection point 14 to the connection conduit 10 are provided by the transport conduit 6, one flow path via the valve arrangement 18 and one flow path directly to the connection conduit 10. In the second position of the valve arrangement 18, the loop is interrupted such that one flow path only (as illustrated by the single headed arrow) from each connection point 14 to the connection conduit 10 is provided by the transport conduit 6, i.e. the flow path leads only directly to the connection conduit 10 and not via the valve arrangement 18 to the connection conduit 10. Moreover, in the first position of the valve arrangement 18 a connection between the cleaning liquid arrangement 16 and the transport conduit 6 is closed, and in the second position of the valve arrangement 18 the connection between the cleaning liquid arrangement 16 and the transport conduit 6 is open. Through the connection conduit 10 the milk and the cleaning liquid, respectively, flow in one direction only. Due to the above described two positions of the valve arrangement 18, milk may flow in two directions through the transport conduit 6, and cleaning liquid may flow in one direction only through the transport conduit 6.

Due to the two flow paths provided in the first position of the valve arrangement 18, the through-flow area for the milk from the milking stations 4 provided by the transport conduit 6 is double that of a cross-sectional area of the transport conduit 6. Thus, the milk will flow more gently to the connection conduit 10 than if only one cross-sectional area of the transport conduit 10 was available. This is beneficial from a milk quality perspective. On the other hand, when only one flow path to the connection conduit 10 is provided in the second position of the valve arrangement 18, only the cross-sectional area of the transport conduit is available as a through-flow area for the cleaning liquid from the cleaning liquid arrangement 16. Thus, a high cleaning liquid velocity and a thorough cleaning of the transport conduit 6 may be ensured. It may be mentioned purely as an example that the transport conduit 6 may often be in the range of 100-600 meters long. For an arrangement 2 for milking animals comprising ten milking stations 4, the diameter of the transport conduit 6 may be e.g. 25 mm. Conversely, the connection conduit 10 may be e.g. in the range of 10-50 meters long with a diameter of 25-50 mm. Thus, the challenge from a milk quality aspect and cleaning aspect is the comparatively long transport conduit 6. It may be advised that a distance between the connection points 14 of the milking stations 4 farthest away from the connection conduit 10 should be rather short, preferably no more than 5-10 meters, to avoid stagnant milk in the transport conduit 6. Such a grouping of milking stations 4 may be advantageous also along other portions of the transport conduit 6.

The cleaning liquid arrangement 16 comprises a cleaning liquid pump 20 and a cleaning liquid container 22. The cleaning liquid arrangement 16 further comprises a cleaning liquid mixing vessel 24 communicating with the cleaning liquid container 22. Conduits connect the cleaning liquid container 22 with the cleaning liquid pump 20, the cleaning liquid pump 20 with the valve arrangement 18, and the connection conduit 10 with the cleaning liquid container 22. With the valve arrangement 18 in the second position, the cleaning liquid pump 20 is adapted to pump cleaning liquid from the cleaning liquid container 22 through the transport conduit 6, through at least part of the connection conduit 10, and back to the cleaning liquid container 22. A milk tank valve 23 is arranged in the connection conduit 10 in vicinity of the main milk tank 8. A return conduit 25 is connected to the connection conduit 10 at, or upstream of, the milk tank valve 23 and extends to the cleaning liquid container 22. Thus, the cleaning liquid pump 20 is adapted to circulate cleaning liquid through the transport conduit 6 and at least part of the connection conduit 10 when the valve arrangement 18 is in the second position and the tank valve 23 is set to close the connection to the main milk tank 8. The tank valve 23 may be a two-way valve and part of a tank valve assembly 27 comprising a further valve 29 arranged in the return conduit 25, as shown in FIG. 1. Alternatively, the tank valve 23 may be a three-way valve arranged in the connection conduit 10 and connecting the return conduit 25 to the connection conduit 10. A remaining part of the connection conduit 10 may be cleaned by a dedicated main milk tank cleaning system (not shown).

During cleaning of the arrangement 2 for milking animals, the valve arrangement 18 may be switched briefly to the second position and back to the first position one or more times to clean the valve arrangement 18 and any conduits adjacent to the valve arrangement 18. Alternatively, if the valve arrangement 18 comprises two two-way valves, both two-way valves may be kept open briefly one or more times to clean the valve arrangement 18 and any conduits adjacent to the valve arrangement 18.

When the valve arrangement 18 is in the first position there is no connection from the cleaning liquid arrangement 16 to the transport conduit 6. Accordingly, the cleaning liquid pump 20 may be shut off when the valve arrangement 18 is in the first position.

In the cleaning liquid mixing vessel 24 one or more batches of cleaning liquid may be mixed, e.g. an acidic detergent may be mixed with water, or an alkali detergent may be mixed with water. Cleaning liquid may be heated in the cleaning liquid mixing vessel 24. From the cleaning liquid mixing vessel 24 cleaning liquid is transferred to the cleaning liquid container 22 for cleaning of the transport conduit 6 and at least part of the connection conduit 10. The cleaning liquid may be heated also in the cleaning liquid container 22. According to alternative embodiments, the cleaning liquid mixing vessel 24 may be omitted. In such embodiments, the water and detergents may be mixed in the cleaning liquid container 22.

Prior to a cleaning of the transport conduit 6 and the connection conduit 10, any remaining milk in the transport conduit 6 and the connection conduit 10 may be ejected to the main milk tank 8. Also, prior to transporting milk through the transport conduit 6 and the connection conduit 10, any remaining cleaning liquid in the transport conduit 6 and the connection conduit 10 may be ejected to the cleaning liquid container 22 or to a drain (not shown). Thus, the cleaning liquid arrangement 16 comprises a fluid admission arrangement 26 for ejecting liquid from the transport conduit 6 and at least part of the connection conduit 10. Suitably, the fluid admission arrangement 26 is connected to a conduit extending between the cleaning liquid pump 20 and the valve arrangement 18. When the transport conduit 6 and the connection conduit 10 are to be emptied, with the valve arrangement 18 in the second position, a valve of the fluid admission arrangement 26 is opened and a fluid, e.g. in the form of compressed air, is admitted into the transport conduit 6 to push milk or cleaning liquid out of the transport conduit 6 and the connection conduit 10.

In the arrangement 2 for milking animals at least one milk filter 28 is arranged in the connection conduit 10. In this manner milk flowing to the main milk tank 8 may be filtered. In these embodiments two milk filters 28 are provided. Thus, one milk filter 28 may be exchanged while milk flows through the other milk filter 28. In the arrangement 2 for milking animals a heat exchanger 30 may be arranged in the connection conduit 10. Thus, milk flowing to the main milk tank 8 may be cooled in the heat exchanger 30 prior to being admitted into the main milk tank 8.

A control device 32 is provided for controlling milk transport in, and cleaning of, the arrangement 2 for milking animals. In particular the control device 32 is adapted to set the valve arrangement 18 in one of the first and second positions, set the tank valve assembly 27, and control the cleaning liquid pump 20. Further, the control device 32 may communicate with the milking stations 4 to coordinate milk transport to the main milk tank 8 on the one hand, and cleaning of the transport conduit 6 and the connection conduit 10 on the other hand. The control device 32 may be implemented as one separate control device or may be formed by several control devices communicating with each other, e.g. a control device of the cleaning liquid arrangement 16 communicating with control devices of the milking stations 4, or a first control device communicating with a control device of the cleaning liquid arrangement 16. In FIG. 1 the control device 32 is schematically illustrated. Boxes drawn with dashed lines indicate devices controlled by the control device 32 and dash-dotted lines indicate communication between the control device 32 and devices in the arrangement 2 for milking animals.

In the at least one milking station 4, vacuum is used for milking a relevant animal and for transporting milk through at least some conduits of the at least one milking station 4, as described below with reference to FIG. 3. On the other hand, in the connection pipe 12, the transport conduit 6, and the connection conduit 10 an atmospheric, or higher than atmospheric, pressure prevails during use of the arrangement 2 for milking animals. Put differently, during milking in the at least one milking station 4 and during use of the cleaning liquid arrangement 16, the arrangement 2 for milking animals may be adapted to maintain atmospheric, or higher than atmospheric, pressure in the transport conduit 6 and the connection conduit 10. The boundary between vacuum and atmospheric pressure may be provided in a local milk collection unit of the at least one milking station 4.

Gravity may be utilized for transporting milk through the connection pipe 12, the transport conduit 6, and the connection conduit 10. Accordingly, at least the transport conduit 6 may be adapted for transporting milk to the connection conduit 10 by means of gravity. That is, the transport conduit 6 may be slightly tilted towards the connection conduit 10 and towards the valve arrangement 18. The cleaning liquid pump 36 may pump the cleaning liquid through the connection pipe 12, the transport conduit 6, and the connection conduit 10. The pressure of the cleaning liquid pump 36 may be sufficient to overcome any tilt of the transport conduit 6.

Figure 2:
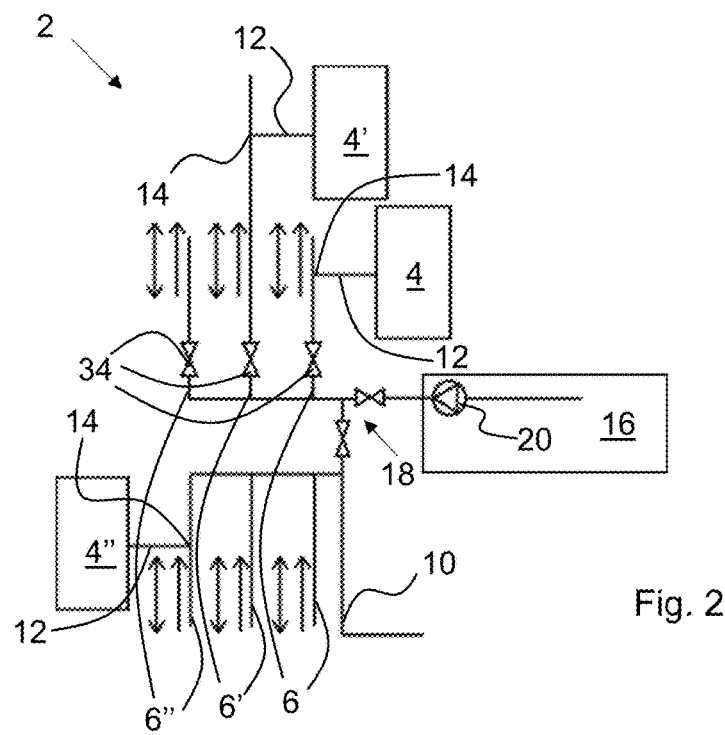
FIG. 2 illustrates details of an arrangement for milking animals according to embodiments.

FIG. 2 illustrates details of an arrangement 2 for milking animals according to embodiments. The arrangement 2 for milking animals of these embodiments comprises the features of the embodiments illustrated in FIG. 1. Two ends of the transport conduit 6, one end of the connection conduit 10 extending from the transport conduit 6 to the main milk tank, and the cleaning liquid pump 20 of the cleaning liquid arrangement 16 (schematically illustrated) are shown in FIG. 2. Again, a valve arrangement 18 is arranged at least partially in the transport conduit 6. In these embodiments the valve arrangement 18 comprises two two-way valves. Alternatively, the valve arrangement 18 may comprise a three-way valve. Again, the valve arrangement 18 may comprise a valve of the boot-seal type.

The arrangement 2 for milking animals comprises at least one further transport conduit 6' and at least one further milking station 4' connected to the further transport conduit 6'. The cleaning liquid arrangement 16 is connected to the at least one further transport conduit 6 via the valve arrangement 18 and the connection conduit 10 extends from the further transport conduit 6' to the main milk tank. The at least one further milking station 4' comprises a connection pipe 12 connected to the further transport conduit 6' at a connection point 14. In the first position of the valve arrangement 18 the further transport conduit 6' forms a further loop such that two flow paths from the connection point 14 to the connection conduit 10 may be provided by the further transport conduit 6'. In the second position of the valve arrangement 18 the further loop may be interrupted such that one flow path only from the connection point 14 to the connection conduit 10 may be provided by the further transport conduit 6'.

More than one transport conduit 6, 6' may in this manner be connected to a main milk tank via one connection conduit 10. Moreover, more than one transport conduit 6, 6' and the connection conduit 10 may be cleaned by the cleaning liquid arrangement 16. In FIG. 2 a third transport conduit 6" and one of its associated milking stations 4" are illustrated. Also the third transport conduit 6" is connected to the connection conduit 10. Again, the double headed arrows indicate the two flow paths provided by each transport conduit 6, 6', 6" from each connection point 14 to the connection conduit 10 when the valve arrangement 18 is in the first position. The single headed arrows indicate the one flow path from each connection point 14 to the connection conduit 10 provided by each transport conduit 6, 6', 6" when the valve arrangement 18 is in the second position.

Each of the transport conduit 6, the further transport conduit 6', and the third transport conduit 6" comprises a valve unit 34, by means of which each of the transport conduits 6, 6', 6" may be closed. The possibility of individually closing each of the transport conduits 6, 6', 6" may be advantageous during cleaning of the transport conduits 6, 6', 6". Thus, only one transport conduit 6, 6', 6" at a time may be kept open. In this manner a high flow of cleaning liquid through an individual transport conduit 6, 6', 6" may be ensured. The cleaning liquid pump 20 thus only needs to provide a cleaning liquid flow sufficient for cleaning one transport conduit 6, 6', 6" at a time.

Figure 3:
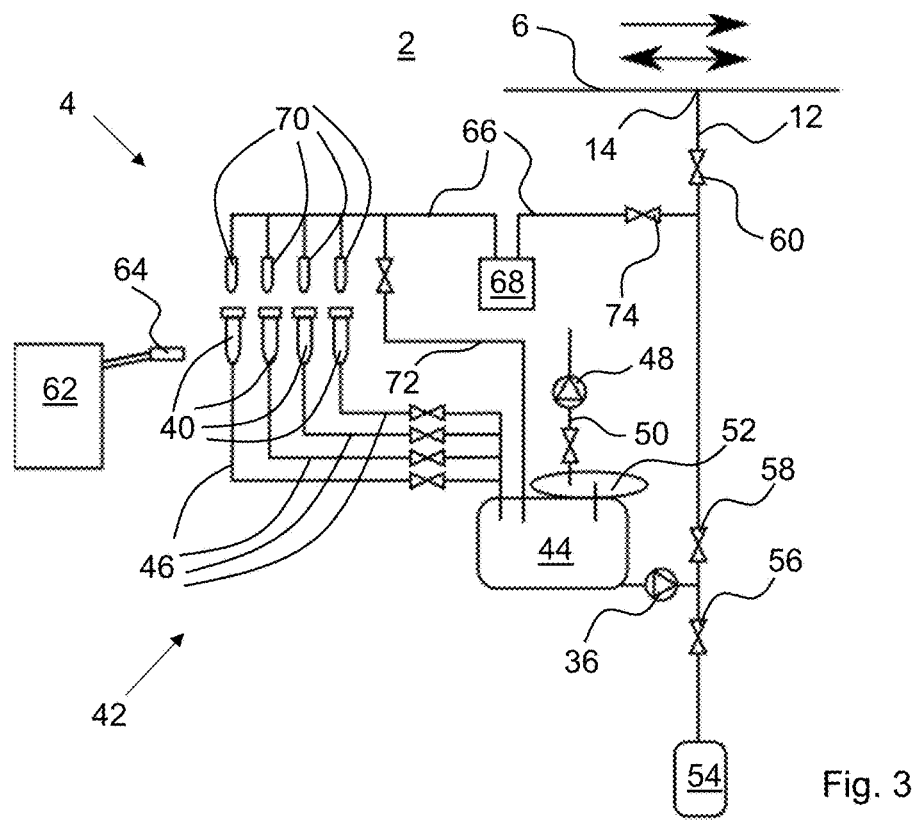
FIG. 3 illustrates embodiments of a milking station of an arrangement for milking animals.

FIG. 3 illustrates embodiments of a milking station 4 of an arrangement 2 for milking animals. As previously mentioned, the arrangement 2 for milking animals comprises a transport conduit 6 and a connection conduit (not shown) extending from the transport conduit 6 to a main milk tank (not shown) of the arrangement 2 for milking animals. The milking station 4 is a milking station for automatically milking animals, i.e. a milking station 4 wherein teat cups 40 of a milking machine 42 (schematically illustrated in FIG. 3) are automatically attached to the teats an animal. The milking station 4 comprises a milking station pump 36 for pumping milk from a local milk collecting unit 44 of the milking machine 42 to the transport conduit 6 of the arrangement 2 for milking animals. The milk is pumped through a connection pipe 12. The connection pipe 12 is connected to the transport conduit 6 at a connection point 14.

The milking station pump 36 of the milking station 4 may be adapted to pump milk from the milking station 4 to the main milk tank via the transport conduit 6 and the connection conduit. As indicated by the double headed arrow, milk may be transported along one or two paths through the transport conduit 6 to the connection conduit when a valve arrangement of the arrangement 2 for milking animals is positioned in the first position. In any case, the milking station pump 36 of the at least one milking station 4 may be adapted to pump milk from the at least one milking station 4 into the transport conduit 6. In the transport conduit 6 the milk may be transported by gravity towards the connection conduit and the milk tank.

The milking machine 42 comprises a set of four teat cups 40 to be attached to the animal to be milked and four milk conduits 46 for conveying the milk extracted from the animal from the teat cups 40 to the local milk collecting unit 44. Vacuum or low pressure is applied to the local milk collecting unit 44 from a vacuum source. In the embodiment disclosed in FIG. 3 the vacuum source is a local vacuum pump 48, which is connected to the local milk collecting unit 4 via a vacuum conduit 50 and a trap member 52 preventing milk from reaching the vacuum conduit 50. Alternatively, the vacuum pump 40 may be a common vacuum pump or form part of a bank of vacuum pumps, providing vacuum to more than more than one milking station. By means of the vacuum pump 48, vacuum, or low pressure, is thus applied to the teat cups 40 in a conventional manner. Thus, vacuum is provided in the local milk collecting unit 44. From the milking station pump 36 and downstream thereof, there is no vacuum in the conduit system of the arrangement 2 for milking animals. Put differently, the pressure in the connection pipe 12 and further downstream in the arrangement 2 for milking animals is at least of atmospheric pressure.

It is to be noted that the milking machine 42 also includes means (not shown) for providing a pulsating movement to teat cup liners (not shown) of the teat cups 40 in a conventional manner.

The milk extracted from the teat cups 40 is thus collected in the local milk collecting unit 44. The fore milk, i.e. the first quantity of the milk obtained during a milk procedure, may be pumped by means of the milking station pump 36 to a divert container 54. The fore milk, or any other milk not suitable for consumption, may be led to the divert container 54 by opening of a first valve 56 and closing of a second valve 58. When milk suitable for consumption is contained in the local milk collecting unit 44 it may be pumped away from the milking station 4 via the connection pipe 12 by means of the milking station pump 36. Thereby, the milk is pumped by the milking station pump 36 to the transport conduit 6. During pumping of the milk to the transport conduit 6, the second valve 58 and a third valve 60, provided on the connection pipe 12, are both open, whereas the first valve 56 is closed.

As mentioned above, the milking station 4 is an automatic milking station, and thus includes an automatic handling device 62 arranged to attach in an automatic manner the teat cups 40 to the teats of an animal to be milked. The automatic handling device 62 comprises a robot arm 64 for handling and moving the teat cups 40.

The teat cups 40 are arranged to be put in a washing position, in which the teat cups 40 may be washed in a time period between two successive milking procedures. The milking station 4 includes a local washing plant for washing of the teat cups 40, the milk conduits 46, the local milk collecting unit 44, the milking station pump 36, and at least a part of the connection pipe 12. The local washing plant includes a washing conduit 66, a washing machine 68 for mixing and heating of washing liquid and any cleaning agents, and washing nozzles 70 to be introduced into the teat cups 2 for washing thereof. The washing plant also includes a washing line 72 for conveying washing liquid directly to the local milk collecting unit 44. Consequently, the washing conduit 66, the milk conduits 46, the local milk collecting unit 44, the washing line 72 and at least part of the connection pipe 12 form a substantially closed re-circulation circuit. During washing of said components of the milking station 4, the third valve 60 and the second valve 56 are closed, whereas a fourth valve 74, provided on the washing conduit 66, and the first valve 58 are opened.

Consequently, the milking station 4 includes all means necessary for performing milking of an animal and washing of the components included in the milking station 4. The milking stations 4 of the arrangement 2 for milking animals are thus provided to operate substantially completely independently of each other.

Figure 4:
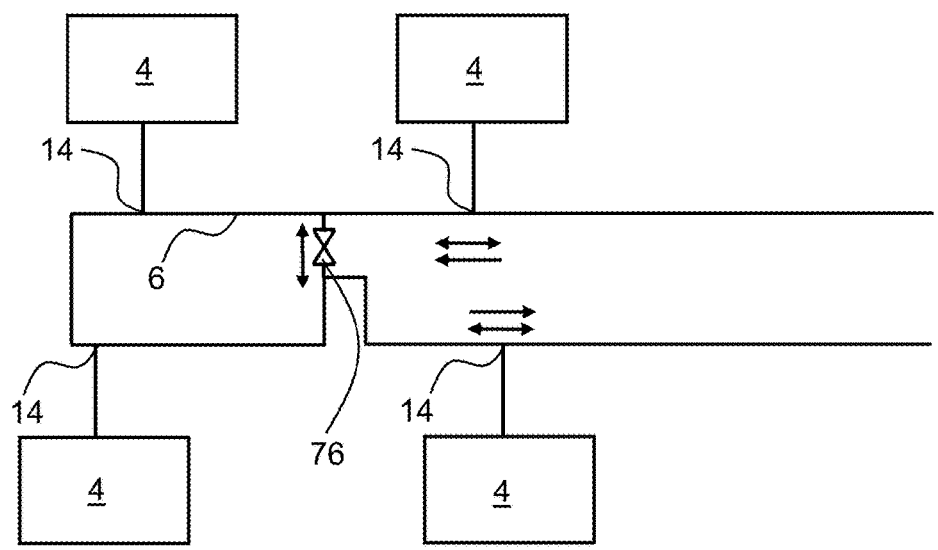
FIG. 4 illustrates embodiments of an arrangement for milking animals.

FIG. 4 illustrates embodiments of an arrangement 2 for milking animals. The arrangement 2 for milking animals comprises the features of the embodiments illustrated in FIG. 1. A portion of the transport conduit 6 and four milking stations 4 are shown in FIG. 4.

Again, a valve arrangement (not shown) is arranged at least partially in the transport conduit 6. The valve arrangement is adapted to be positioned in at least a first position and a second position such that the transport conduit 6 provides two flow paths (as illustrated by the double headed arrows) from the connection points 14 of the milking stations 4 to the connection conduit (not shown) in the first position, and one flow path only (as illustrated by the single headed arrows) from the connection points 14 to the connection conduit in the second position.

The arrangement 2 for milking animals comprises a bypass valve 76 connected at two positions to the transport conduit 6. The bypass valve 76, in an open position, is adapted to short circuit the transport conduit 6. This may be advantageous for preventing stagnant milk in the transport conduit 6.

When the valve arrangement is in its first position to provide two flow paths in the transport conduit 6, situations may occur when milk in the transport conduit is pushed back and forth therein. To prevent this, milking stations 4 which are physically located comparatively close to each other may be connected to opposite end portions of the transport conduit 6, such as for example the two right-hand milking stations 4 in FIG. 4. When the bypass valve 76 is open a short loop is formed by the opposite end portions of the transport conduit 6 via the bypass valve 76. Accordingly, when milking takes place in one or both of the two right-hand milking stations 4 and not in the two left-hand milking stations 4 in FIG. 4, the bypass valve 76 may be opened and two flow paths to the connection conduit may be provided in the transport conduit by the short loop. The longer flow path for each of the right-hand milking stations 4, of the two flow paths available without the bypass valve 76, is thus eliminated.

The bypass valve 76 may be controlled by the control device discussed in connection with FIG. 1. Further valves may be provided in the transport conduit 6 adjacent to the bypass valve 76 to ensure flow of milk through the short loop when the bypass valve 76 is open. The bypass valve 76 may be of a type, which may be cleaned from both ends when closed.

Alternatively, during cleaning of the transport conduit 6, the bypass valve 6 may be opened and closed one or more times. More than one bypass valve may be provided.

This invention should not be construed as limited to the embodiments set forth herein. A person skilled in the art will realize that different features of the present invention may be combined to create embodiments other than those described herein, without departing from the scope of the present invention, as defined by the appended claims. Although the invention has been described with reference to example embodiments, many different alterations, modifications and the like will become apparent for those skilled in the art. The main milk tank 8 may for instance be a mobile milk tank, which when filled may be transported to a dairy.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. An arrangement (2) for milking animals comprising:
   at least one milking station (4) comprising a milking station pump (36);
   a main milk tank (8) for storing the milk from the at least one milking station (4);
   a connection pipe (12) connected to an outlet of the at least one milking station (4);
   a transport conduit (6) connected to the connection pipe (12) at a connection point (14),
   wherein the transport conduit (6), at the connection point, extends in a first direction that provides a first flow path and extends in an opposite, second direction that provides a second flow path opposite to the first flow path, the transport conduit (6) transporting the milk received from at least one milking station (4) via the connection pipe (12) through the connection point (14) and then through the transport conduit (6) through at least one of the first flow path and the second flow path;
   a connection conduit (10) extending from the transport conduit (6) to the main milk tank (8);
   a valve arrangement (18) arranged in the transport conduit (6) downstream of the connection point (14), the valve arrangement (18) being positionable in at least a first position and a second position; and
   a cleaning liquid arrangement (16), the cleaning liquid arrangement (16) being connectable to the transport conduit (6) via the valve arrangement (18),
   wherein i) with the valve arrangement (18) in the first position, the transport conduit (6) forms a loop such that the milk received from the connection pipe divides, at the connection point, into two oppositely directed milk flows that respectively flow through the first and second flow paths in transport conduit (6) that extend from the connection point (14) to the connection conduit (10), and ii) with the valve arrangement (18) in the second position, the loop is interrupted such that only one of the first and second flow paths that extend from the connection point (14) to the connection conduit (10) remains open for fluid flow.

2. The arrangement (2) for milking animals according to claim 1, comprising:
   plural of the at least one milking station (4), and plural of the connection pipe (12), each connection pipe (12) connected to the outlet of a corresponding one of the plural milking stations (4), plural of the connection point (14), the transport conduit (6) being connected to each of the connection pipes (12) at a corresponding one of the connection points (14), wherein, the main milk tank (8) receives and stores the milk from each of the milking stations (4), wherein the transport conduit (6), at each of the connection points, extends in the first direction that provides the first flow path and extends in the opposite, second direction that provides the second flow path opposite to the first flow path, the transport conduit (6) transporting the milk received from each of the plural milking stations (4) via the corresponding connection pipes (12) through the corresponding connection points (14) and then through the transport conduit (6) through at least one of the first flow path and the second flow path;

wherein i) with the valve arrangement (18) in the first position, the transport conduit (6) forms the loop such that the milk received from each of the connection pipes divides, at the connection points, into the two oppositely directed milk flows that respectively flow through the first and second flow paths in transport conduit (6) that extend from the connection point (14) to the connection conduit (10), and ii) with the valve arrangement (18) in the second position, the loop is interrupted such that only one of the first and second flow paths that extend from the connection point (14) to the connection conduit (10) remains open for fluid flow.

3. An arrangement (2) for milking animals comprising:
at least one milking station (4) comprising a milking station pump (36);
a main milk tank (8) for storing the milk from the at least one milking station (4);
a connection pipe (12) connected to an outlet of the at least one milking station (4);
a transport conduit (6) connected to the connection pipe (12) at a connection point (14), the transport conduit (6) transporting the milk received from at least one milking station (4) via the connection pipe (12) at the connection point (14);
a connection conduit (10) extending from the transport conduit (6) to the main milk tank (8);
a valve arrangement (18) arranged in the transport conduit (6), the valve arrangement (18) being positionable in at least a first position and a second position; and
a cleaning liquid arrangement (16), the cleaning liquid arrangement (16) being connectable to the transport conduit (6) via the valve arrangement (18),
wherein i) with the valve arrangement (18) in the first position, the transport conduit (6) forms a loop such that the milk received from the connection pipe divides, at the connection point, into two oppositely directed milk flows that respectively flow through two flow paths that extend from the connection point (14) to the connection conduit (10), and ii) with the valve arrangement (18) in the second position, the loop is interrupted such that only one of the two flow paths that extend from the connection point (14) to the connection conduit (10) remains open for fluid flow, wherein,
with the valve arrangement (18) in the first position, a connection between the cleaning liquid arrangement (16) and the transport conduit (6) is closed,
the milk is pumped through the two flow paths of the transport conduit, and with the valve arrangement (18) in the second position, the connection between the cleaning liquid arrangement (16) and the transport conduit (6) is open.

4. The arrangement (2) for milking animals according to claim 3, wherein,
the cleaning liquid arrangement (16) comprises a cleaning liquid pump (20) and a cleaning liquid container (22), and
with the valve arrangement (18) in the second position, the cleaning liquid pump (20) pumps cleaning liquid from the cleaning liquid container (22) through the transport conduit (6) via the one of the two flow paths that extend from the connection point (14) to the connection conduit (10) that remains open for fluid flow, through at least part of the connection conduit (10), and back to the cleaning liquid container (22).

5. The arrangement (2) for milking animals according to claim 4, wherein the cleaning liquid arrangement (16) comprises a cleaning liquid mixing vessel (24) communicating with the cleaning liquid container (22).

6. The arrangement (2) for milking animals according to claim 3, further comprising a milk tank valve (23) arranged in the connection conduit (10) in a vicinity of the main milk tank (8), wherein the cleaning liquid arrangement (16) comprises a return conduit connected to the connection conduit (10) at, or upstream of, the milk tank valve (23).

7. The arrangement (2) for milking animals according to claim 3, wherein at least one milk filter (28) is arranged in the connection conduit (10).

8. The arrangement (2) for milking animals according to claim 3, wherein a heat exchanger (30) is arranged in the connection conduit (10).

9. The arrangement (2) for milking animals according to claim 3, wherein during milking in the at least one milking station (4) and during use of the cleaning liquid arrangement, the arrangement (2) is maintained at atmospheric, or higher than atmospheric, pressure in the transport conduit (6) and the connection conduit (10).

10. The arrangement (2) for milking animals according to claim 3, wherein the cleaning liquid arrangement (16) comprises a fluid admission arrangement (26) for ejecting liquid from the transport conduit (6) and at least part of the connection conduit (10).

11. The arrangement (2) for milking animals according to claim 3, wherein the valve arrangement (18) comprises a three-way valve.

12. The arrangement (2) for milking animals according to claim 3, wherein the valve arrangement (18) comprises two two-way valves.

13. The arrangement (2) for milking animals according to claim 3, wherein the valve arrangement (18) comprises a boot-seal valve.

14. The arrangement (2) for milking animals according to claim 3, further comprising a bypass valve (76) connected at two positions to the transport conduit (6), wherein with the bypass valve (76) in an open position, the bypass valve (76) short circuits the transport conduit (6).

15. The arrangement (2) for milking animals according to claim 3, further comprising at least one further transport conduit (6') and at least one further milking station (4') connected to the further transport conduit (6'),
wherein the cleaning liquid arrangement (16) is connected to the further transport conduit (6') via the valve arrangement (18) and the connection conduit (10) extends from the further transport conduit (6') to the main milk tank (8), wherein the at least one further milking station (4') comprises a further connection pipe (12) being connected to the further transport conduit (6') at a further connection point (14), and wherein i) with the valve arrangement (18) in the first position, the further transport conduit (6') forms a further loop such that the milk flow in two flow paths from the further connection point (14) to the connection conduit (10) in the further transport conduit (6'), and ii) with the valve arrangement (18) in the second position, the further loop is interrupted such that only the milk flows in the further transport conduit (6') in only one flow path from the further connection point (14) to the connection conduit (10).

16. The arrangement (2) for milking animals according to claim 3, comprising:

plural of the at least one milking station (4), plural of the connection pipe (12), each connection pipe (12) connected to the outlet of a corresponding one of the plural milking stations (4), and plural of the connection point (14), the transport conduit (6) being connected to each of the connection pipes (12) at a corresponding one of the connection points (14), wherein, the main milk tank (8) receives and stores the milk from each of the milking stations (4), wherein the transport conduit (6), at each of the connection points, extends in a first direction that provides a first flow path and extends in an opposite, second direction that provides a second flow path opposite to the first flow path, the transport conduit (6) transporting the milk received from each of the plural milking stations (4) via the corresponding connection pipes (12) through the corresponding connection points (14) and then through the transport conduit (6) through at least one of the first flow path and the second flow path;

wherein i) with the valve arrangement (18) in the first position, the transport conduit (6) forms the loop such that the milk received from each of the connection pipes divides, at the connection points, into the two oppositely directed milk flows that respectively flow through the first and second flow paths in transport conduit (6) that extend from the connection point (14) to the connection conduit (10), and ii) with the valve arrangement (18) in the second position, the loop is interrupted such that only one of the first and second flow paths that extend from the connection point (14) to the connection conduit (10) remains open for fluid flow.

17. A method of operating an arrangement (2) for milking animals comprising the steps of:

transporting milk from at least one milking station (4) to a main milk tank (8) for storing the milk from the at least one milking station (4), wherein the at least one milking station (4) comprising a milking station pump (36), the milk being transported via i) a connection pipe (12) connected to an outlet of the at least one milking station (4), ii) a transport conduit (6) having a connection point (14) to the connection pipe (12), the transport conduit (6) transporting the received from the connection pipe (12) at the connection point (14), iii) a connection conduit (10) extending from the transport conduit (6) to the main milk tank (8), wherein a valve arrangement (18) is arranged in the transport conduit (6), the valve arrangement (18) being positionable in at least a first position and a second position, and a cleaning liquid arrangement (16) is connectable to the transport conduit (6) via the valve arrangement (18);

positioning the valve arrangement (18) in the first position to have the transport conduit (6) form a loop such that the milk received from the connection pipe divides, at the connection point, into two milk flows that respectively flow through two oppositely directed flow paths that extend from the connection point (14) to the connection conduit (10), and positioning the with the valve arrangement (18) in the second position, interrupts the loop such that only one of the two flow paths that extend from the connection point (14) to the connection conduit (10) remains open to fluid flow, wherein, with the valve arrangement (18) in the first position, a connection between the cleaning liquid arrangement (16) and the transport conduit (6) is closed, the milk is pumped through the two flow paths of the transport conduit, and with the valve arrangement (18) in the second position, the connection between the cleaning liquid arrangement (16) and the transport conduit (6) is open.

18. The method according to claim 17, comprising the further steps of;

operating a cleaning liquid pump (20) within the cleaning liquid arrangement (16), the cleaning liquid pump (20) being a cleaning liquid container (22); and with the valve arrangement (18) in the second position, having the cleaning liquid pump (20) pump cleaning liquid from the cleaning liquid container (22) through the transport conduit (6) via the one of the two flow paths that extend from the connection point (14) to the connection conduit (10) and remains open for fluid flow, through at least part of the connection conduit (10), and back to the cleaning liquid container (22).

19. The method according to claim 17, comprising the further step of operating a bypass valve (76) connected at two positions to the transport conduit (6) to short circuit a portion of the transport conduit (6).

20. The method according to claim 17, wherein the valve arrangement (18) comprises a three-way valve, and the three-way valve is operated for move from the first position to the second positions for cleaning the arrangement.

* * * * *